(12) United States Patent
Wang et al.

(10) Patent No.: US 10,069,317 B2
(45) Date of Patent: Sep. 4, 2018

(54) WEARABLE POWER SUPPLY AND HAND WORN MOBILE DEVICE HAVING THE SAME

(71) Applicants: Daniel Wang, Taipei (TW); Li-Yuan Wang, Taipei (TW)

(72) Inventors: Daniel Wang, Taipei (TW); Li-Yuan Wang, Taipei (TW)

(*) Notice: Subject to any disclaimer, the term of this patent is extended or adjusted under 35 U.S.C. 154(b) by 0 days.

(21) Appl. No.: 15/601,140

(22) Filed: May 22, 2017

(65) Prior Publication Data
US 2017/0346319 A1    Nov. 30, 2017

(30) Foreign Application Priority Data

May 25, 2016   (CN) .......................... 2016 1 0352097
Aug. 24, 2016  (CN) .......................... 2016 1 0711796

(51) Int. Cl.
G06F 1/18      (2006.01)
H02J 7/00      (2006.01)
A44C 5/00      (2006.01)
G06F 1/16      (2006.01)
G04G 21/00     (2010.01)
G06F 1/26      (2006.01)
H01M 2/10      (2006.01)
H01M 10/04     (2006.01)

(52) U.S. Cl.
CPC .......... *H02J 7/0044* (2013.01); *A44C 5/0007* (2013.01); *G04G 21/00* (2013.01); *G06F 1/163* (2013.01); *G06F 1/263* (2013.01); *H01M 2/1005* (2013.01); *H01M 10/0436* (2013.01); *H02J 7/0054* (2013.01); *H01M 2220/30* (2013.01); *H02J 7/0013* (2013.01); *H02J 7/0045* (2013.01)

(58) Field of Classification Search
CPC ....................................................... H01R 13/62
USPC ....................................................... 361/679.21
See application file for complete search history.

(56) References Cited

U.S. PATENT DOCUMENTS

2017/0033567 A1*    2/2017   Adamisin ............... H02J 7/025

* cited by examiner

*Primary Examiner* — Jerry Wu
(74) *Attorney, Agent, or Firm* — Rosenberg, Klein & Lee

(57) ABSTRACT

A wearable power supply includes a strap to be worn on a user's wrist, arm, waist, leg or head; a flexible secondary battery carried by the strap; and a connector slot disposed on the strap and electrically connected to the flexible secondary battery, wherein the flexible secondary battery is capable of supplying current to a mobile device via a connecting wire connected between the connector slot and the mobile device, and is recharged from an external power supply connected to the connector slot. When the wearable power supply takes the form of a wristband, it can be used as a carrier of a hand worn mobile device, such as a smart watch or a smart bracelet, to provide a longer operating range.

5 Claims, 8 Drawing Sheets

WEARABLE POWER SUPPLY AND HAND WORN MOBILE DEVICE HAVING THE SAME

BACKGROUND OF THE INVENTION

1. Field of the Invention

The present invention relates to a wearable power supply and a hand worn mobile device having the same.

2. Description of the Prior Art

With the smart mobile phone becoming the mainstream, portable mobile devices, such as smart watches and smart bracelets, have also been put onto consumers' annual wish list. More and more entertainments, works, social activities, communication, sports and health management, can be performed through mobile devices. With the expansion of the application scope and the function of the mobile devices, the use time also increases, and as a result, the capacity of the built-in battery of the current mobile devices is unable to meet the demands of most consumers. In the face of this situation, a multi-purpose mobile power supply has become the consumers' necessary peripheral in addition to purchasing more batteries. More particularly, a mobile power supply becomes even more necessary when the battery of the mobile device, such as iPhone, is difficult or cannot be replaced.

There are various types of mobile power supplies available on the market, however, they all have to be carried in the handbag, backpack or travel bag, and cannot be directly worn by the user. Therefore, the existing mobile power supplies are difficult to carry and use.

On the other hand, the components of the hand worn mobile devices, including the microcontroller, batteries, headphones, microphones, speakers and other basic components are all assembled in the body of the mobile device. The high-speed development of manufacturing technology allows the size of the components to be continuously reduced, however, the components still have a certain thickness, which makes it very difficult for the mobile device to be further thinned. Besides, assembly and maintenance of the mobile devices are inconvenient, once any of the components is broken and needs replacement, it cannot be replaced individually at any time. Moreover, most of the hand worn mobile devices are only provided with charging slot and SIM card slot, and there will be no other slots available.

The present invention has arisen to mitigate and/or obviate the afore-described disadvantages.

SUMMARY OF THE INVENTION

One object of the present invention is to provide a wearable power supply which can be worn on the user's wrist, arm, waist, leg or head, as a backup power supply.

Another object of the present invention is to provide a mobile device which has a wearable power supply as a carrier, to provide a longer operating range for hand worn mobile devices, such as a smart watch or a smart bracelet.

Further object of the present invention is to provide a hand worn mobile device which can make the mobile device body thinner and lighter, and facilitate to the assembly of the mobile device, and replacement and upgrade of individual component.

To achieve the above objects, a wearable power supply in accordance with the present invention, comprises a strap worn on a user; a flexible secondary battery mounted on the strap; a connector slot disposed on the strap and electrically connected to the flexible secondary battery, wherein the flexible secondary battery is capable of supplying current to a mobile device via a connecting wire connected between the connector slot and the mobile device, and is recharged from an external power supply connected to the connector slot.

A hand worn mobile device in accordance with the present invention, comprises a wearable power supply comprising a strap worn on a user, a flexible secondary battery mounted on the strap, and a connector slot disposed on the strap and electrically connected to the flexible secondary battery, wherein the secondary battery is capable of supplying current to a mobile device via a connecting wire connected between the connector slot and the mobile device, and is recharged from an external power supply connected to the connector slot; and a mobile device body being attached to and supplied with power from the wearing power supply.

In another embodiment of the present invention, the hand worn mobile device comprises a strap worn on a user; a plurality of module slots formed on the strap; and a plurality of mobile device peripheral modules inserted in the module slots respectively.

The module slots include but are not limited to battery module slots, connector slots, memory card module slots, SIM card module slots, keypad module slots, earphone module slots, speaker module slots, camera module slots and light source module slots.

The hand worn mobile device further comprises a mobile device body which is attached to the strap and provided with a built-in microcontroller which is electrically connected to the module slots.

As compared to the prior art, the invention has the following advantages: the wearable power supply of the present invention can take the form of a wristband, armband, waistband, leggings or headband, and is worn on the user's wrist, arm, waist, leg or head to supply power to the mobile device at any time. Further, the wearable power supply can also be used as a carrier of the hand worn device, such as a smart watch and a smart bracelet, to provide a longer operating range, reducing the frequency of recharging. Besides, the battery, earphone, microphone and speaker which were installed in the mobile device body have been modularized and inserted in the module slots of the wristband, so that the mobile device body becomes more thinner, which facilitates to the assembly of the mobile device, and replacement and upgrade of individual component.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
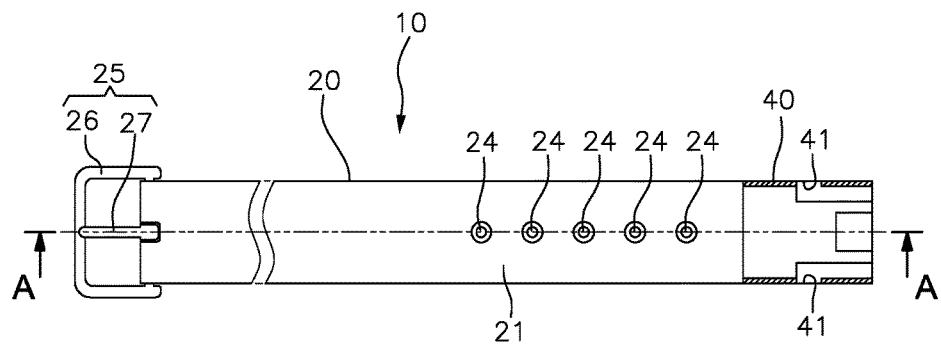
FIG. 1 is a top view of the wearable power supply in accordance with the present invention.
Figure 2:
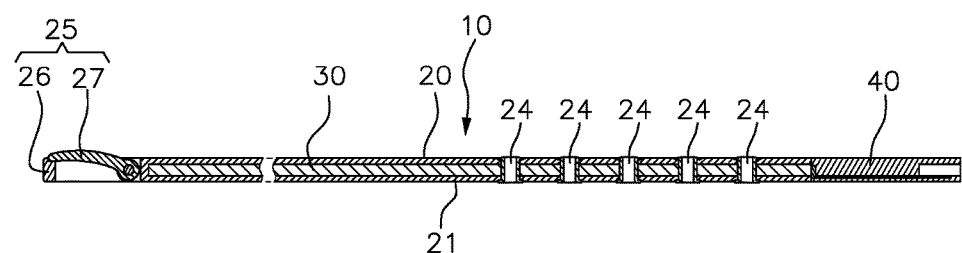
FIG. 2 is a cross sectional view taken along the line A-A of FIG. 1.

Referring to FIGS. 1 and 2, a wearable power supply 10 in accordance with the preferred embodiment of the present invention comprises a strap 20, a flexible secondary battery 30 and a connector slot 40.

The strap 20 includes a strap body 21 and a buckle 25. The strap body 21 is made of bendable material, such as silicone rubber, leather, with a desired length to carry the flexible secondary battery 30 and the connector slot 40, and is provided with a plurality of equidistantly spaced tongue holes 24. The buckle 25 is fastened to one end of the strap body 21, and includes a frame 26 and a tongue 27 pivoted to the frame 26. The strap 20 is worn in the same way as a watchstrap or a waistband. Firstly, winding the strap 20 around a user's wrist, arm, waist, leg or head, and then inserting the connector slot 40 which is connected to another end of the strap body 21 through the frame 26, then inserting the tongue 27 into one of the tongue holes 24, so that the two ends of the strap body 21 are fastened to each other to form a ring shape, and in this way, the strap 20 can be removably worn by a user. Other well-known technologies, such as magnets, magic felt, etc., for connecting the two ends of the strap body 21 together are all adoptable, and are not limited by the buckle 25.

Figure 4:
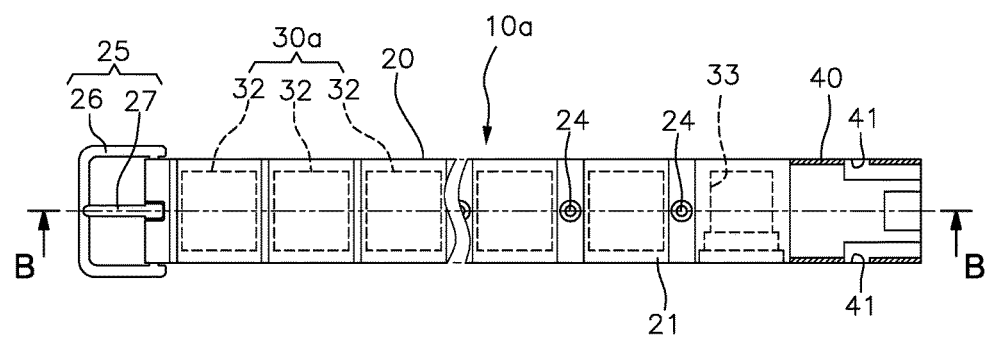
FIG. 4 is a top view in accordance with an embodiment of the invention similar to FIG. 1.
Figure 5:
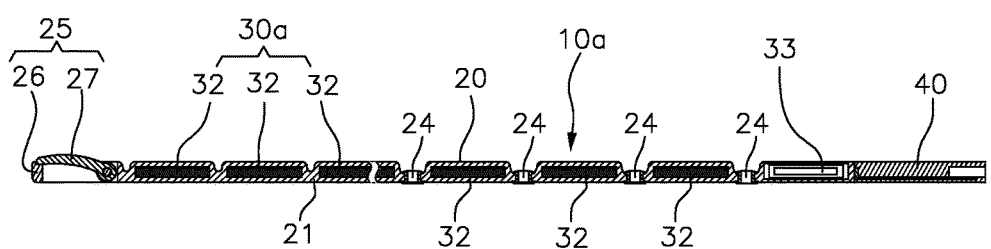
FIG. 5 is a cross sectional view taken along the line B-B of FIG. 4.

The flexible secondary battery 30 are embedded in the strap body 21 and located along the strap 20, and the flexible secondary battery 30 and the strap body 21 are arranged in a sandwich manner. In this embodiment, the flexible secondary battery 30 is flat and flexible and bendable along with the strap body 21. In another embodiment as shown in FIGS. 4 and 5, the flexible secondary battery 30a consists of a plurality of equidistantly spaced and parallel connected battery cores 32, and in this way the formed wearable power supply 10a is also arbitrarily bendable. When the battery cores 32 are parallel connected to form the flexible secondary battery 30a, each of the tongue holes 24 can be arranged between two battery cores 32, without having to form the tongue hole 24 on the battery cores 32. In the embodiment as shown in FIGS. 4 and 5, the strap body 21 is further provided with at least one module slot 33 for insertion of mobile device peripherals, such as memory card module or SIM card module (not shown) to improve the function of the wearable power supply 10a, and the module slot 33 is electrically connected to the connector slot 40. In like manner, the wearable power supply 10 as shown in FIGS. 1 and 2, the length of the flexible secondary battery 30 is shortened to leave some space on the strap body 21 for at least one module slot (now shown) for installation of mobile device peripherals.

The connector slot 40 is located at an appropriate position on the strap body 21 and used as an interface for connection of charger or mobile device (both are not shown). In the embodiment shown in FIGS. 1-5, the connector slot 40 is located at another end of the strap body 21, namely opposite to the end where the buckle 25 is located, and electrically connected to the flexible secondary battery 30 (30a), so that the flexible secondary battery 30 (30a) can supply current to the mobile device via a connecting wire 50 connected between the connector slot 40 and the mobile device, or can be recharged from an external power supply, such as a charger (not shown) connected to the connector slot 40. The connector slot 40 can be a USB slot, or Mini USB or Micro USB slot depending on the width of the strap body 21. Other forms of interfaces can also be adopted, without being limited by the USB interface.

Figure 3:
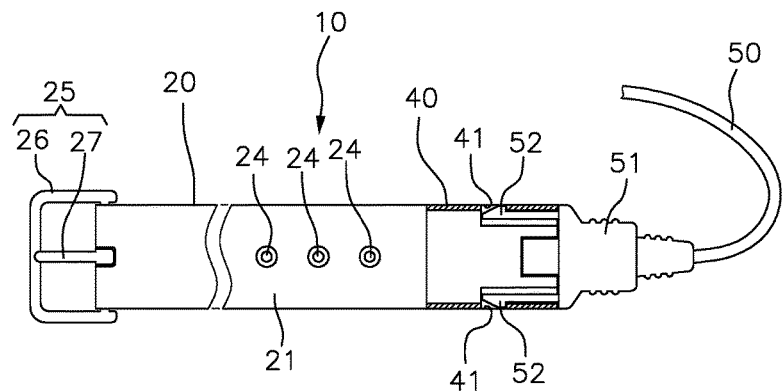
FIG. 3 is a cross sectional view of the present invention showing the interlock status of the connector slot and the plug.

To prevent the plug 51 of the connecting wire 50 from disengaging from the connector slot 40 in case of collision or pulling, in the embodiment shown in FIGS. 1 and 3, the connector slot 40 is provided with two mortises 41 on two opposite sidewalls of the connector slot 40, and the plug 51 is provided with two elastic tenons 52. When the plug 51 is completely inserted in the connector slot 40, the elastic tenons 52 will be elastically engaged in the mortises 41, so that the plug 51 is engaged in the connector slot 40 without loosening off, thus ensuring a stable and reliable electrical connection. When the plug 51 is inserted in the connector slot 40, pressing the elastic tenons 52 inward from both sides can unlock the plug 51 from the mortises 41, and then pulling the plug 51 backward to release it from the connector slot 40.

The wearable power supply 10 (30a) of the present invention can take the form of a wristband, armband, waistband, leggings or headband, and is worn on the user's wrist, arm, waist, leg or head. The wearable power supply is easy to carry, as a backup power supply for mobile devices, such as smart phones, smart watches, smart bracelets and other mobile devices backup power, eliminating the inconvenience caused by the environment where there is no charging equipment. For example, if a built-in battery of a smart watch has a size of 30(length)×20(width)×5(thickness)mm, and a capacity of 500 mAh, the size of the flexible secondary battery 30 of the formed wearable power supply 10 will be as large as 150(length)×30(width)×2(thickness) mm, under the condition of the same specific energy, the capacity will be 1500 mAh, which is triple the former capacity. In other words, the wearable power supply 10 worn on the wrist can extend 3 times the operation time of the smart watch. Likewise, when the wearable power supply 10 takes the form of an armband, waistband, leggings or headband which is longer, wider and thicker than the wristband, it can provide a capacity which is several times or ten more times the capacity of the wristband type of wearable power supply 10, which allows the mobile device to work for a long period of time.

Figure 6:
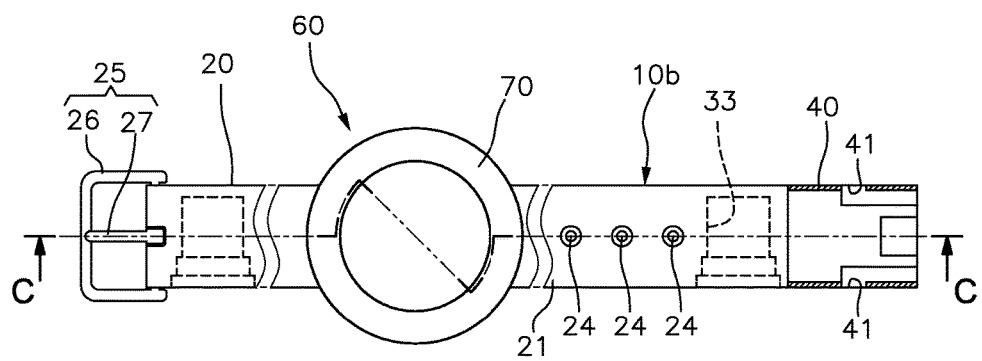
FIG. 6 is a top view of the hand worn mobile device in accordance with an embodiment of the present invention.
Figure 7:
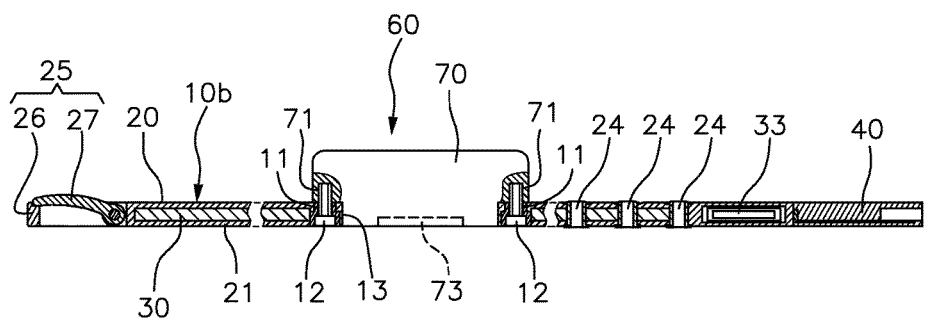
FIG. 7 is a cross sectional view taken along the line C-C of FIG. 6.
Figure 8:
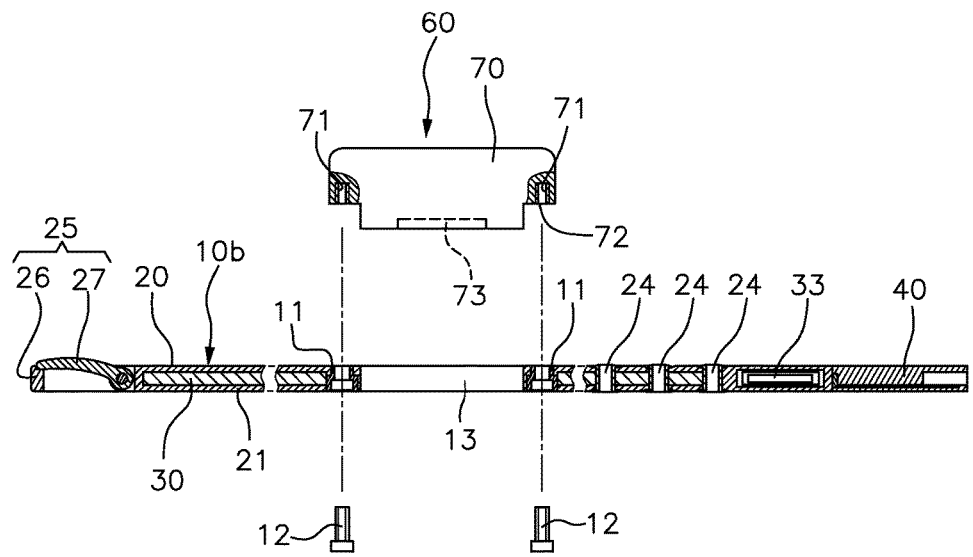
FIG. 8 is an exploded view of FIG. 6.

The wearable power supply 10 (10*a*) after a little modification, can also be used as a carrier of a hand worn mobile device, such as a smart watch or a smart bracelet, to provide a longer operating range. As shown in FIGS. 6-8, a hand worn mobile device 60 includes a wearable power supply 10*b* and a mobile device body 70.

The wearable power supply 10*b* can be any form of the abovementioned wearable power supplies 10 (10*a*). Besides, in order to carry the mobile device body 70, a set of conductive sleeves 11 which is electrically connected to the flexible secondary battery 30 (30*a*) and provided for installation a set of screws 12 is approximately disposed at the center of the wearable power supply 10*b*.

The mobile device body 70 is attached to the wearable power supply 10*b*, so that the mobile device body 70 which is provided with microcontroller and display screen or indicator light (not shown) can be worn on the user's wrist through the wearable power supply 10*b*, and can be supplied with power by the wearable power supply 10*b* to process data and display relative information. A set of conductive threaded holes 71 is formed at the bottom of the mobile device body 70 and aligned with the set of conductive sleeves 11 of the wearable power supply 10*b*, and the screws 12 are screwed in the conductive threaded holes 71 along with the conductive sleeves 11, so that the mobile device body 70 is fixed and electrically connected to the wearable power supply 10*b*, so as to form the hand worn mobile device 60.

A positioning hole 13 is defined in an area surrounded by the set of conductive sleeves 11 in order to enable a heart rate sensor 73 which is built in the mobile device body 70 to detect the user's heart rate. The mobile device body 70 is a stepped structure with an upper portion whose diameter is greater than a diameter of a lower portion of the mobile device body 70. The lower portion is inserted in the positioning hole 13 of the wearable power supply 10*b* until a stepped surface 72 between the upper and lower portions is abutted against the upper surface of the strap body 21, so that the heart rate sensor 73 can touch the user's wrist through the positioning hole 13 of the wearable power supply 10*b* to detect the magnitude of the reflected green signal during venous contraction and dilation, and then display the detected heart rate on the display screen of the mobile device body 70. The conductive threaded holes 71 are located on the stepped surface 72 of the mobile device body 70. The shape of the mobile device body 70 can be a cube or a cuboid or a similar shape with a wider upper portion and a narrow lower portion, and is not restricted by the circular shape.

Figure 9:
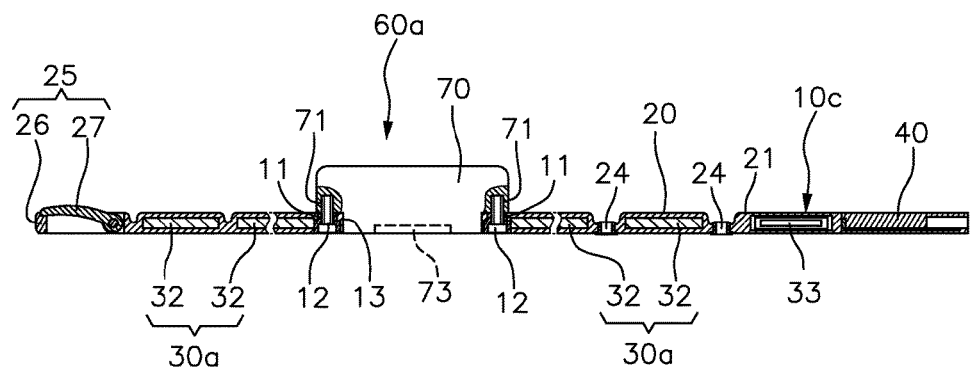
FIG. 9 is a top view in accordance with an embodiment of the invention similar to FIG. 7.

FIG. 9 shows a hand worn mobile device 60*a* similar to the above embodiment, wherein the wearable power supply 10*c* and the flexible secondary battery 30*a* shown are the same as those shown in FIGS. 4 and 5, and consist of a plurality of parallel connected battery cores 32, which enables the wearable power supply 10*c* to be arbitrarily bendable and worn on the user's body.

Figure 10:
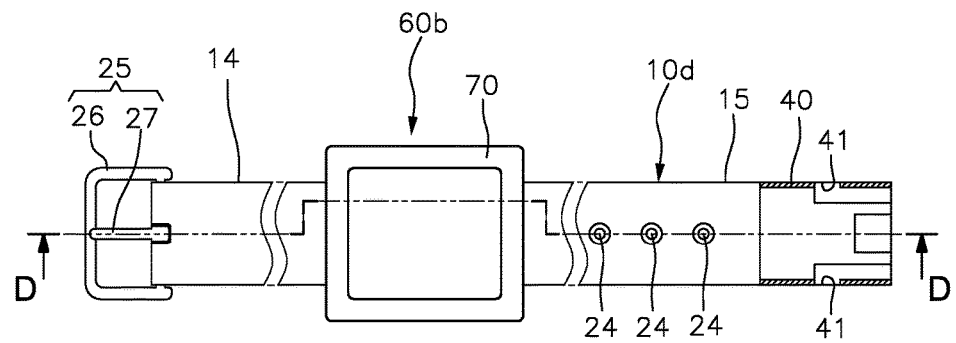
FIG. 10 is a top view of the hand worn mobile device in accordance with another embodiment of the present invention.
Figure 11:
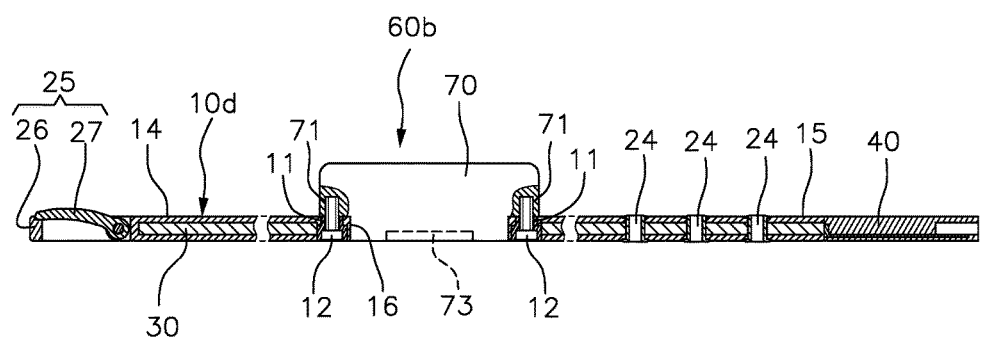
FIG. 11 is a cross sectional view taken along the line D-D of FIG. 10.
Figure 12:
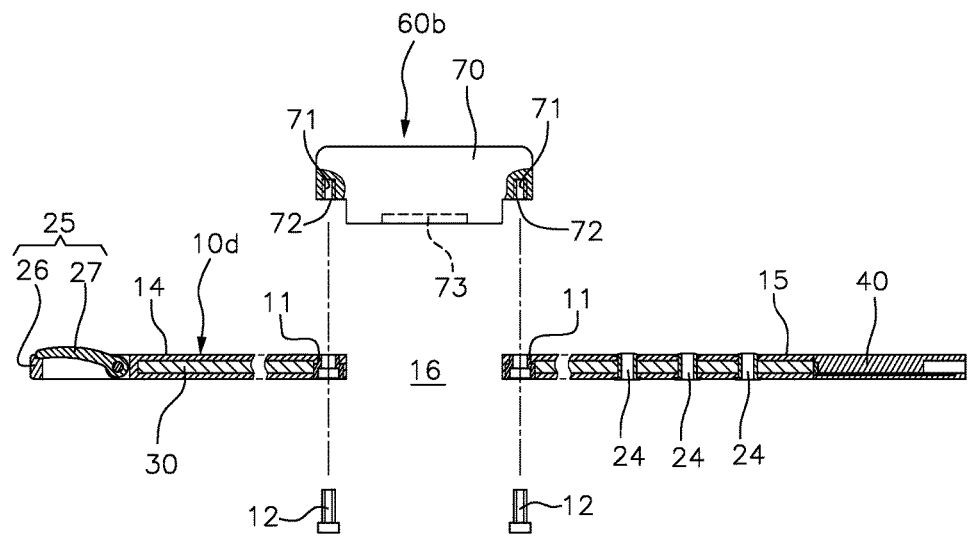
FIG. 12 is an exploded view of FIG. 10.

The present invention is not limited by the aforementioned embodiments, and can also be in other forms. FIGS. 10-12 show that a hand worn mobile device 60*b* of another embodiment of the present invention is similar to the aforementioned embodiments and also includes a wearable power supply 10*d* and the mobile device body 70, except that the wearable power supply 10*d* includes a first power supply module 14 and a second power supply module 15 which are connected to two ends of the mobile device body 70. Each of the ends of the first and second power supply modules 14, 15 connected to the mobile device body 70 is provided with a plurality of conductive sleeves 11 which are electrically connected to the flexible secondary battery 30 and are provided for installation of a set of screws 12. The mobile device body 70 is a stepped structure with an upper portion whose size is greater than a size of a lower portion of the mobile device body 70, which is same as the previous embodiment. The lower portion is disposed between the first and second power supply modules 14, 15, the set of conductive threaded holes 71 is formed in the stepped surface 72 between the upper and lower portions to receive the set of screws 12, so that the mobile device body 70 is positioned between and electrically connected to the first and second power supply modules 14, 15, and the heart rate sensor 73 which is built in the mobile device body 70 can detect the user's heart rate through the gap 16 between the first and second power supply modules 14, 15.

Figure 13:
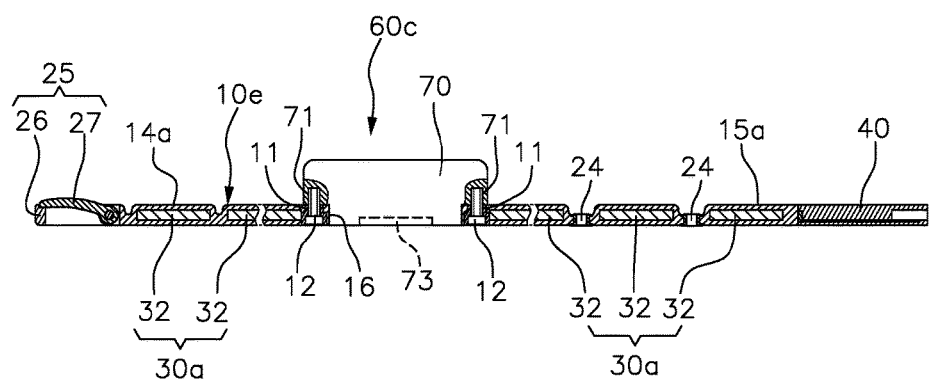
FIG. 13 is a top view in accordance with an embodiment of the invention similar to FIG. 11.

FIG. 13 is a cross sectional view of another embodiment of the present invention, wherein the hand worn mobile device 60*c* is similar to the hand worn mobile device 60*b*, except that each of the flexible secondary batteries 30*a* of the first and second power supply modules 14*a*, 15*a* consists of a plurality of parallel connected battery cores 32, so that the wearable power supply 10*e* is flexible and arbitrarily bendable.

Figure 14:
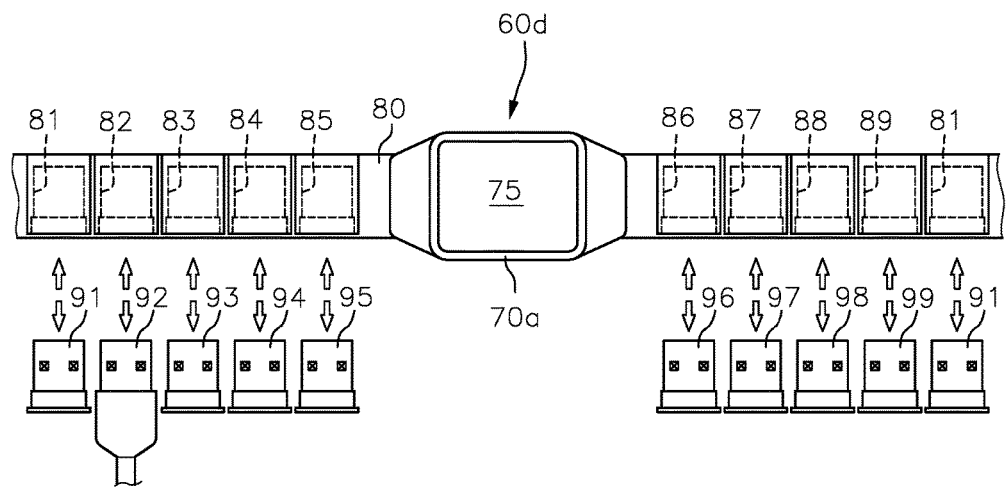
FIG. 14 is a top view of the hand worn mobile device in accordance with another embodiment of the present invention.
Figure 15:
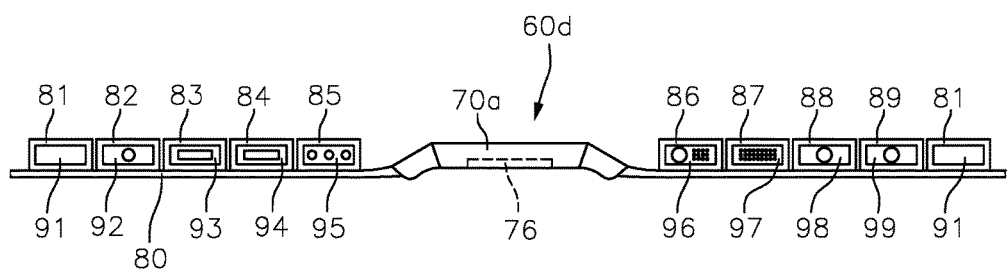
FIG. 15 is a front view of FIG. 14.
Figure 16:
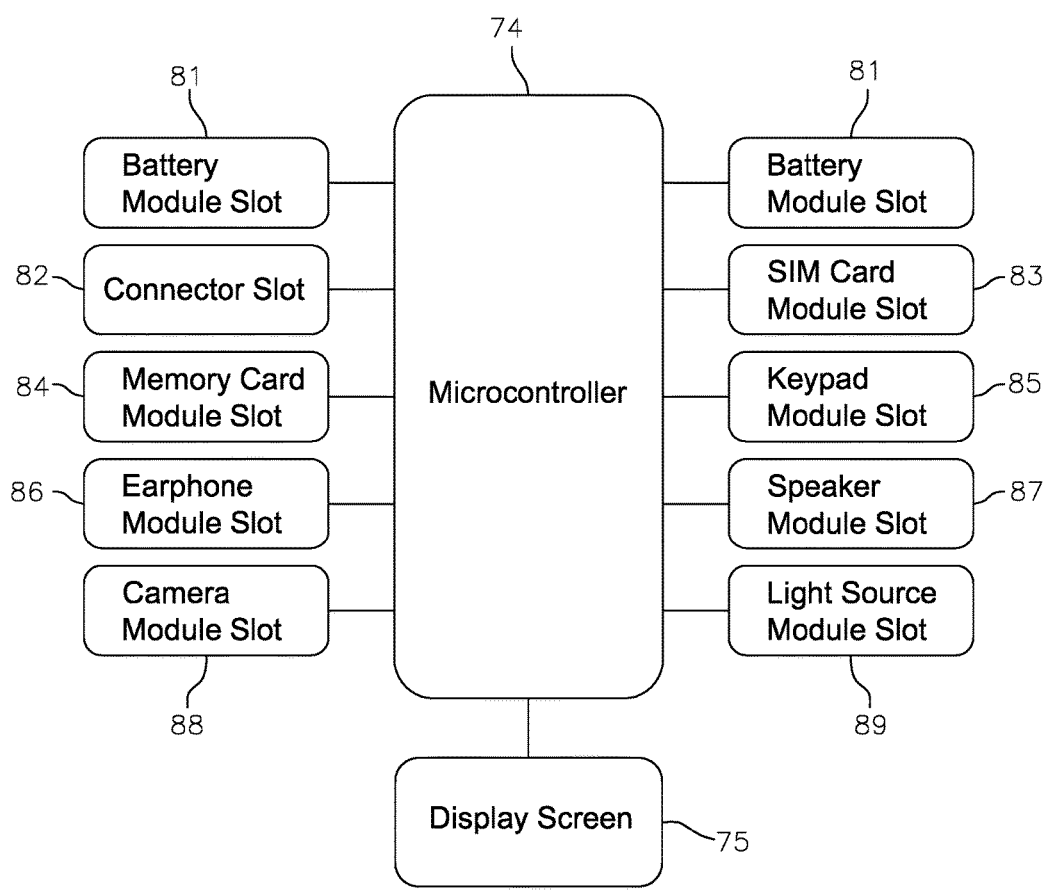
FIG. 16 is a circuit block diagram of FIG. 15.

FIGS. 14-16 show that a hand worn mobile device 60*d* in accordance with another embodiment of the invention includes a mobile device body 70*a* and a strap 80 which enables the mobile device body 70*a* to be removably worn on the user's wrist. The mobile device body 70*a* includes a microcontroller 74 and a display screen 75 which are used to perform the data processing of (including but not limited to) time, social, communication, sports, and/or health management and the displaying of relevant information. The display screen 75 includes touch screen and non-touch screen. The hand worn mobile device 60*d* can also be used in combination with a smart phone, without being provided with the display screen 75, and uses a set of indicator light (not shown) and vibration to notify incoming call, text message and various information. In a preferred embodiment, the mobile device body 70*a* is provided with a built-in heart rate sensor 76 which is electrically connected to the microcontroller 74 to detect the user's heart rate.

The strap 80 is provided with two battery module slots 81, a connector slot 82, a memory card module slot 83, a SIM card module slot 84, a keypad module slot 85, an earphone module slot 86, a speaker module slot 87, a camera module slot 88 and a light source module slot 89 for insertion of two battery modules 91, a connecting wire plug 92, a memory card module 93, a SIM card module 94, a keypad module 95, an earphone module 96, a speaker module 97, a camera module 98 and a light source module 99 respectively, so that these modular components 91-99 can be inserted in the corresponding module slots 81-89 to establish electric connection with the microcontroller 74. This embodiment is only provided for example and explanation purpose, and does not intend to limit the invention. The strap 80 can be provided with all or a part of the module slots 81-89, or with more other module slots in order to improve function.

Only the microcontroller 74 and the display screen 75 are provided on the mobile device body 70*a*, other basic components of the hand worn mobile device 60*d* of this embodiment are all modularized and inserted in the module slots 81-89 of the strap 80. Therefore, the mobile device body 70*a* becomes more thinner, which facilitates to the assembly of the mobile device, and replacement and upgrade of individual component. This embodiment is not limited to the hand worn mobile device, such as the smart watch and smart bracelet, it can also be used in smart phone, allowing the smart phone to be worn on the wrist, making it easy to carry. This design is more advantageous especially when it is used in the sports activities, like cycling, jogging and mountaineering.

The above mobile device body 70a is provided with the microcontroller 74 and the display screen 75, which enables the hand worn mobile device 60d to have the function of data processing and information displaying. But for some purposes, the mobile device body 70a can also be omitted, only the strap 80, the module slots 81-89 on the strap 80 and the mobile device peripheral modules 91-99 are used to constitute a support type hand worn mobile device which is used in combination with the smart phone, the smart watch, the smart bracelet, the computer, and etc.

While we have shown and described various embodiments in accordance with the present invention, it is clear to those skilled in the art that further embodiments may be made without departing from the scope of the present invention.

What is claimed is:

1. A mobile device, comprising:
   a wearable power supply including a strap worn on a user;
   a flexible secondary battery mounted on the strap;
   a connector slot disposed on the strap and electrically connected to the flexible secondary battery, the flexible secondary battery supplying current to the mobile device via a connecting wire connected between the connector slot and the mobile device and being recharged from an external power supply connected to the connector slot; and
   a mobile device body attached to and supplied with power from the wearable power supply;
   wherein the wearable power supply is provided with a positioning hole surrounded by a set of conductive sleeves, the set of conductive sleeves being electrically connected to the flexible secondary battery and being provided with a set of screws for installation, wherein the mobile device body has an upper portion whose size is greater than a size of a lower portion of the mobile device body, the lower portion being inserted in the positioning hole, wherein a set of conductive threaded holes is formed on a stepped surface between the upper and lower portions of the mobile device body, the set of screws being screwed in the set of conductive threaded holes and the set of conductive sleeves, the mobile device body is thereby fixed to and electrically connected to the wearable power supply.

2. The mobile device as claimed in claim 1, wherein the strap includes at least one mobile device peripheral module slot electrically connected to the connector slot.

3. The mobile device as claimed in claim 1, wherein the flexible secondary battery includes a plurality of parallel connected battery cores.

4. The mobile device as claimed in claim 1, wherein the connector slot is provided with two mortises on two opposite sidewalls of the connector slot, and the connecting wire includes a plug provided with two elastic tenons, wherein when the plug is substantially completely inserted in the connector slot, the elastic tenons are elastically engaged in the mortises, the plug is thereby locked in the connector slot.

5. The mobile device as claimed in claim 1, wherein a heart rate sensor is built in the mobile device body to detect the user's heart rate by touching the user's wrist through the positioning hole of the wearable power supply.

\* \* \* \* \*